United States Patent
Li et al.

(10) Patent No.: US 12,461,613 B2
(45) Date of Patent: Nov. 4, 2025

(54) TOUCHPAD DEVICE

(71) Applicant: Chicony Electronics Co., Ltd., New Taipei (TW)

(72) Inventors: Po-Hsin Li, New Taipei (TW); Min-Yuan Chen, New Taipei (TW); Wen-Yuan Lin, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 18/887,287

(22) Filed: Sep. 17, 2024

(65) Prior Publication Data

US 2025/0155997 A1    May 15, 2025

(30) Foreign Application Priority Data

Nov. 9, 2023    (TW) .................................. 112143320

(51) Int. Cl.
*G06F 3/033*       (2013.01)
*G06F 3/0354*      (2013.01)

(52) U.S. Cl.
CPC ................................ *G06F 3/03547* (2013.01)

(58) Field of Classification Search
CPC .... G06F 3/033; G06F 3/0354; G06F 3/03547; G06F 2203/04101; G06F 2203/04102; G06F 2203/04114
See application file for complete search history.

(56) References Cited

U.S. PATENT DOCUMENTS

| | | | | |
|---|---|---|---|---|
| 8,957,332 | B2 * | 2/2015 | Yamada | H01H 3/125 200/344 |
| 11,442,562 | B2 * | 9/2022 | Li | G06F 3/03547 |
| 11,449,156 | B1 * | 9/2022 | Li | G06F 1/1616 |
| 11,520,383 | B1 * | 12/2022 | Li | G06F 1/1658 |
| 12,293,030 | B2 * | 5/2025 | Li | G06F 3/03547 |
| 2021/0263556 | A1 * | 8/2021 | Degner | G06F 3/04883 |
| 2021/0333898 | A1 * | 10/2021 | Wang | G06F 3/03547 |
| 2022/0066580 | A1 * | 3/2022 | Lin | G06F 3/03547 |
| 2022/0091691 | A1 * | 3/2022 | Han | G06F 3/04166 |

* cited by examiner

*Primary Examiner* — Joe H Cheng
(74) *Attorney, Agent, or Firm* — MUNCY, GEISSLER, OLDS & LOWE, P.C.

(57) ABSTRACT

A touchpad device includes a substrate, a touch panel, a switch, a balancing assembly, and a triggering member. An inner surface of the touch panel facing the substrate has a central region. The switch is disposed between the substrate and the touch panel and corresponds to the central region. The balancing assembly is disposed between the touch panel and the substrate and includes a first balancing bar, a second balancing bar, a third balancing bar, and a fourth balancing bar. The triggering member has a top portion and a bottom portion, the bottom portion is leaned against end portions of a first swing bar of the first balancing bar, a second swing bar of the second balancing bar, a third swing bar of the third balancing bar, and a fourth swing bar of the fourth balancing bar which are adjacent to the switch, and the top portion contacts the switch.

15 Claims, 8 Drawing Sheets

TOUCHPAD DEVICE

CROSS-REFERENCE TO RELATED APPLICATION

This non-provisional application claims priority under 35 U.S.C. § 119(a) to Patent Application No. 112143320 filed in Taiwan, R.O.C. on Nov. 9, 2023, the entire contents of which are hereby incorporated by reference.

BACKGROUND

Technical Field

The instant disclosure relates to an input device, in particular, to a touchpad device.

Related Art

Touchpads are common input devices widely applied in computers. The touchpad is provided for sensing the movement or pressing of a user's finger(s) to control the cursor to perform an action (e.g., to move, to click, or the like).

SUMMARY

A touchpad known to the inventor has a touch panel and a substrate. The touch panel has a pivot side, and the touch panel is pivotally fixed on the substrate through the pivot side. When a portion of the touch panel away from the pivot side is pressed, the touch panel swings downward with respect to the substrate by taking the pivot side as the swing axis so as to generate corresponding signal(s).

However, when the user operates the touch panel, the user cannot always accurately press the portion of the touch panel away from the pivot side. As a result, when the user presses the pivot side of the touch panel or a region or a corner of the touch panel adjacent to the pivot side, the touch panel cannot be moved downward smoothly to generate corresponding signals. Moreover, the user cannot operate the touch panel conveniently and the operation feeling of the user will be affected.

In view of this, in one embodiment, a touchpad device is provided. The touchpad device comprises a substrate, a touch panel, a switch, a balancing assembly, and a triggering member. The touch panel is disposed above the substrate, the touch panel has an inner surface facing the substrate, and the inner surface has a central region. The switch is disposed between the substrate and the touch panel, and the switch corresponds to the central region. The balancing assembly is disposed between the touch panel and the substrate. The balancing assembly comprises a first balancing bar, a second balancing bar, a third balancing bar, and a fourth balancing bar arranged radially. A first inner end of the first balancing bar is adjacent to the switch and has a first swing bar. A second inner end of the second balancing bar is adjacent to the switch and has a second swing bar. A third inner end of the third balancing bar is adjacent to the switch and has a third swing bar. A fourth inner end of the fourth balancing bar is adjacent to the switch and has a fourth swing bar. The triggering member is disposed between the central region of the touch panel and the substrate. The triggering member has a top portion and a bottom portion, the bottom portion is leaned against end portions of the first swing bar, the second swing bar, the third swing bar, and the fourth swing bar, and the top portion contacts the switch.

Based on the above, in the touchpad device according to one or some embodiments of the instant disclosure, the switch is disposed on the central region of the touch panel, and the one ends of the first balancing bar, the second balancing bar, the third balancing bar, and the fourth balancing bar which are arranged radially are adjacent to the switch. Moreover, the triggering member is leaned against the end portions of the first swing bar, the second swing bar, the third swing bar, and the fourth swing bar which are adjacent to the switch. Therefore, during the operation of the touchpad device, when any portion of the touch panel (for example, the corner or the edge of the touch panel) is pressed, the pressing force can be directly and quickly transmitted to the triggering member through the balancing assembly, and the triggering member can be moved toward the switch to accelerate the triggering of the switch. Hence, the issues of excessive wobbling, bending, or empty stroke of the touch panel generated upon the corner or the edge of the touch panel is pressed can be prevented. Moreover, the stroke of the touch panel for the pressing operation can be reduced, so that the user can have a proper operation feeling.

BRIEF DESCRIPTION OF THE DRAWINGS

The disclosure will become more fully understood from the detailed description given herein below for illustration only, and thus not limitative of the disclosure, wherein.

DETAILED DESCRIPTION

It should be noted that, in the descriptions for the embodiments, the ordinal numbers, e.g., "first" to "eighth" are respectively used to describe different elements, and these elements are not limited due to the use of these ordinal numbers. Moreover, in all the drawings, the same reference numbers are used to indicate the same or similar elements.

Figure 1:
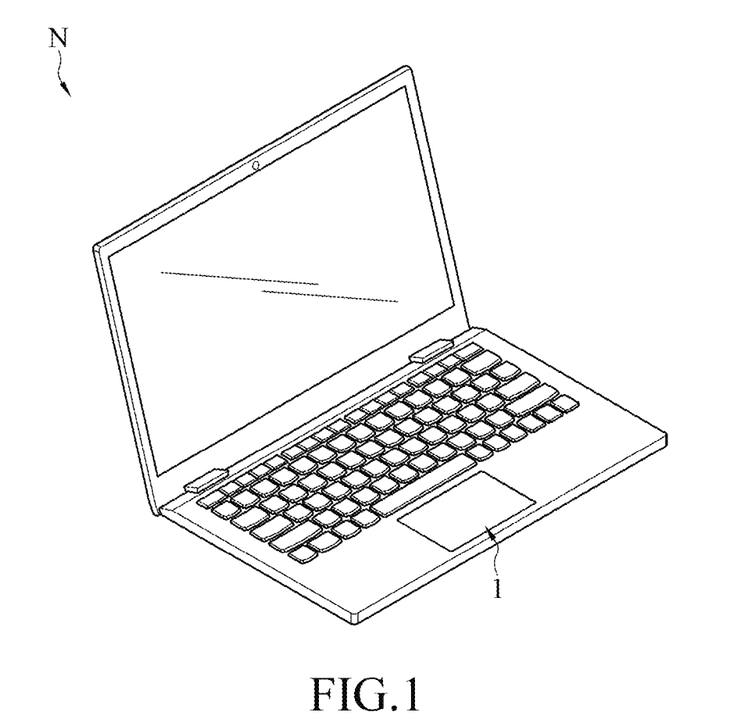
FIG. 1 illustrates a schematic application view of a touchpad device according to an exemplary embodiment of the instant disclosure.
Figure 2:
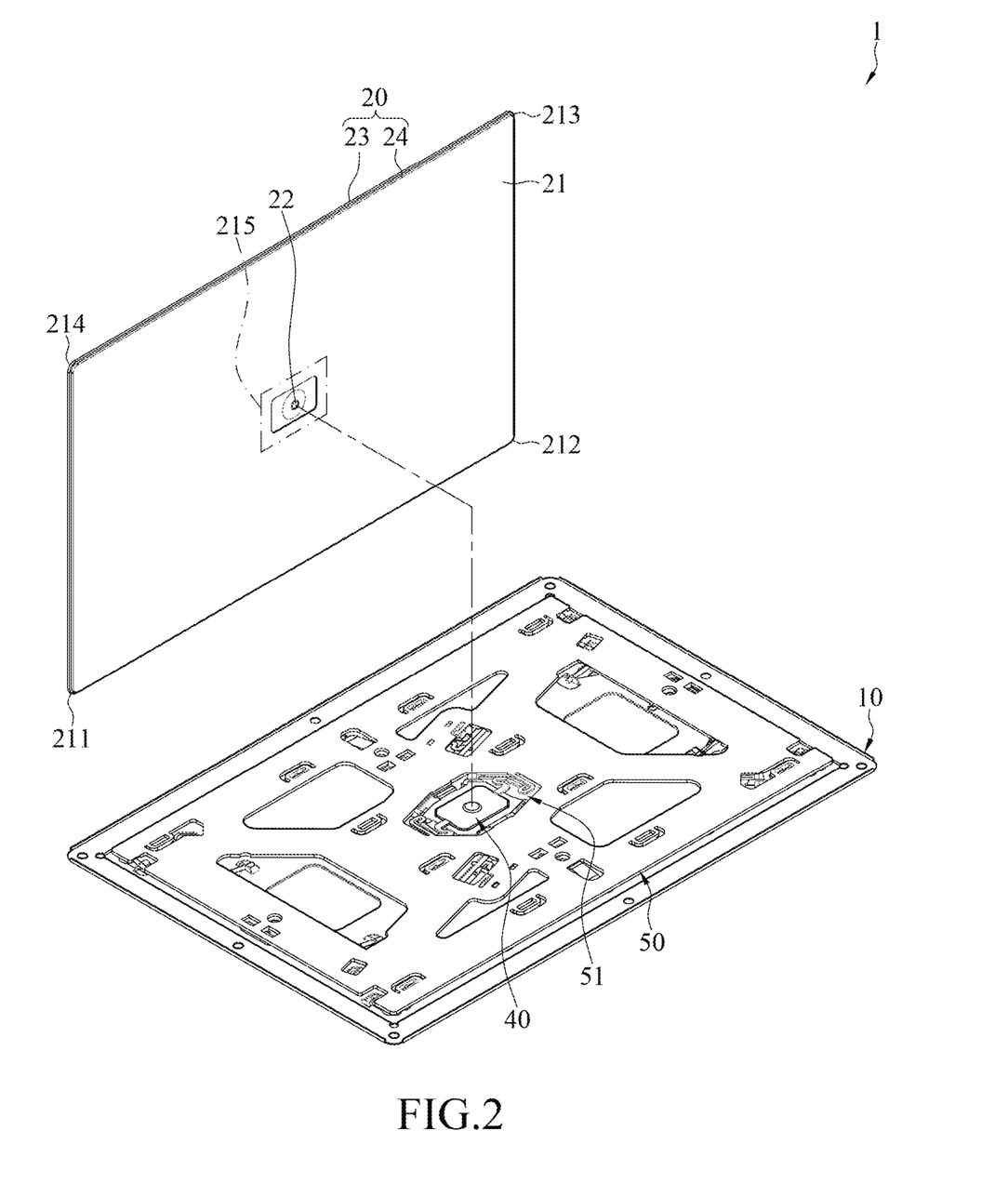
FIG. 2 illustrates an exploded view of the touchpad device according to the exemplary embodiment of the instant disclosure.
Figure 3:
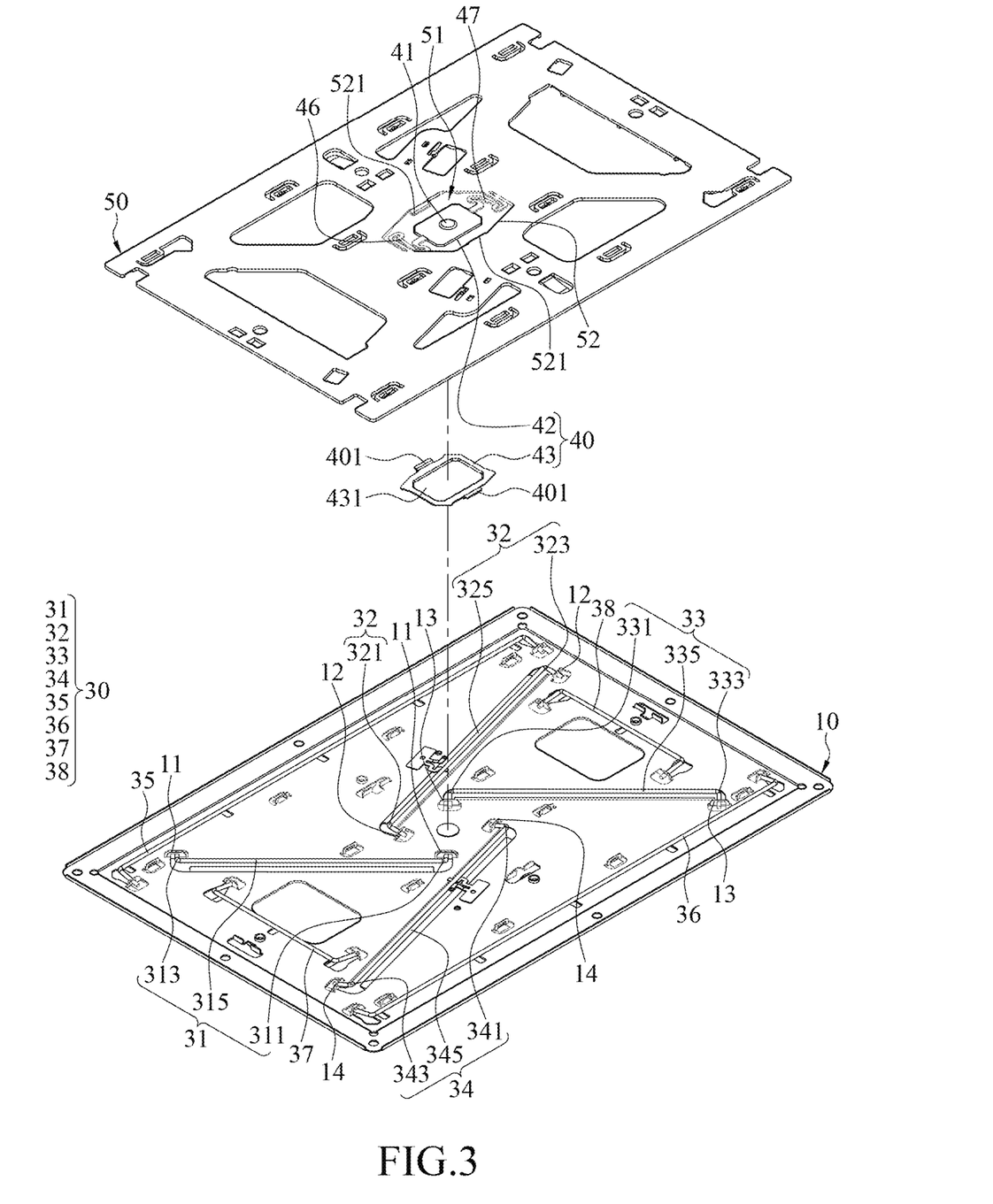
FIG. 3 illustrates another exploded view of the touchpad device according to the exemplary embodiment of the instant disclosure.

FIG. 1 illustrates a schematic application view of a touchpad device according to an exemplary embodiment of the instant disclosure. FIG. 2 illustrates an exploded view of the touchpad device according to the exemplary embodiment of the instant disclosure. FIG. 3 illustrates another exploded view of the touchpad device according to the exemplary embodiment of the instant disclosure. As shown in FIG. 1 and FIG. 2, according to one or some embodiments of the instant disclosure, the touchpad device 1 may be applied in a computer product, and the user can operate the touchpad device 1 by sliding or pressing the touchpad device 1 with the user's finger(s) so as to control the movement of the cursor or to generate corresponding control signal(s). For example, as shown in FIG. 1, in this embodiment, the touchpad device 1 is applied in a notebook computer N, but the instant disclosure is not limited thereto. In some embodiments, the touchpad device 1 may be applied in other portable computers (e.g., tablet computers). Alternatively, in some embodiments, the touchpad device 1 may be an individual device and may be capable of externally connected to a portable computer, but the instant disclosure is not limited thereto.

As shown in FIG. 2 and FIG. 3, in the first embodiment, the touchpad device 1 comprises a substrate 10, a touch panel 20, a switch 22, a balancing assembly 30, and a triggering member 40. The substrate 10 may be a rigid plate made of metal (e.g., iron, aluminum, alloy, or the like) or plastic material. The touch panel 20, the switch 22, the balancing assembly 30, and the triggering member 40 are all disposed on the substrate 10.

As shown in FIG. 2 and FIG. 3, the touch panel 20 is configured to be touched or pressed by a user. The touch panel 20 has an inner surface 21 facing the substrate 10, and the inner surface 21 has a central region 215. In FIG. 2, the boundary of the central region 215 is represented by one-dot chain line; however, it is understood that the one-dot chain line does not actually exist on the central region 215 of the touch panel 20. The switch 22 is disposed between the substrate 10 and the touch panel 20, and the switch 22 corresponds to the central region 215. The switch 22 may be for example a button switch or a microswitch. In this embodiment, the central region 215 is a partial surface region of the inner surface 21, a center of the central region 215 may correspond to a center of the inner surface 21, the switch 22 is within the central region 215, and a center of the switch 22 may correspond to the center of the central region 215, but the instant disclosure is not limited thereto. In some embodiments, the switch 22 may be disposed on other portions of the central region 215.

Further, as shown in FIG. 2, the touch panel 20 may comprise a touch board 23 and a circuit board 24 stacked with each other. The circuit board 24 is between the touch board 23 and the substrate 10, the central region 215 is a partial surface region of the circuit board 24 facing the substrate 10, and the switch 22 is disposed on a center of a surface of the circuit board 24 facing and substrate 10 and corresponds to the central region 215.

As shown in FIG. 2 and FIG. 3, the balancing assembly 30 is disposed between the touch panel 20 and the substrate 10. The balancing assembly 30 comprises a first balancing bar 31, a second balancing bar 32, a third balancing bar 33, and a fourth balancing bar 34 which are arranged radially. In this embodiment, the inner surface 21 of the touch panel 20 is of a rectangular shape and has a first corner 211, a second corner 212, a third corner 213, and a fourth corner 214. The first corner 211 and the third corner 213 are opposite corners, and the second corner 212 and the fourth corner 214 are opposite corners.

With reference to FIG. 2 and FIG. 3. The first balancing bar 31 has a first inner end 311 and a first outer end 313 opposite to the first inner end 313, and the first inner end 311 and the first outer end 313 are respectively adjacent to the switch 22 and the first corner 211. The second balancing bar 32 has a second inner end 321 and a second outer end 323 opposite to the second inner end 321, and the second inner end 321 and the second outer end 323 are respectively adjacent to the switch 22 and the second corner 212. The third balancing bar 33 has a third inner end 331 and a third outer end 333 opposite to the third inner end 331, and the third inner end 331 and the third outer end 333 are respectively adjacent to the switch 22 and the third corner 213. The fourth balancing bar 34 has a fourth inner end 341 and a fourth outer end 343 opposite to the fourth inner end 341, and the fourth inner end 341 and the fourth outer end 343 are respectively adjacent to the switch 22 and the fourth corner 214. In other words, in this embodiment, the first balancing bar 31, the second balancing bar 32, the third balancing bar 33, and the fourth balancing bar 34 are not parallel to the side of the touch panel 20; instead, in this embodiment, the first balancing bar 31, the second balancing bar 32, the third balancing bar 33, and the fourth balancing bar 34 surround the switch 22 and are arranged radially with respect to the switch 22.

As shown in FIG. 2 and FIG. 3, the first balancing bar 31 has a first shaft 315, the second balancing bar 32 has a second shaft 325, the third balancing bar 33 has a third shaft 335, and the fourth balancing bar 34 has a fourth shaft 345. The first shaft 315, the second shaft 325, the third shaft 335, and the fourth shaft 345 are respectively pivotally connected to the lower portion of the touch panel 20, so that the first shaft 315, the second shaft 325, the third shaft 335, and the fourth shaft 345 can rotate with respect to the touch panel 20. For example, in this embodiment, the inner surface 21 of the touch panel 20 is provided with an assembling plate 50, and the first shaft 315, the second shaft 325, the third shaft 335, and the fourth shaft 345 are pivotally connected to the assembling plate 50, respectively. In some embodiments, the assembling plate 50 may be a rigid plate made of metal or plastic material(s), and the assembling plate 50 may be stacked and fixed to the inner surface 21 of the touch panel 20 through adhering, riveting, locking, welding, or the like.

Figure 4:
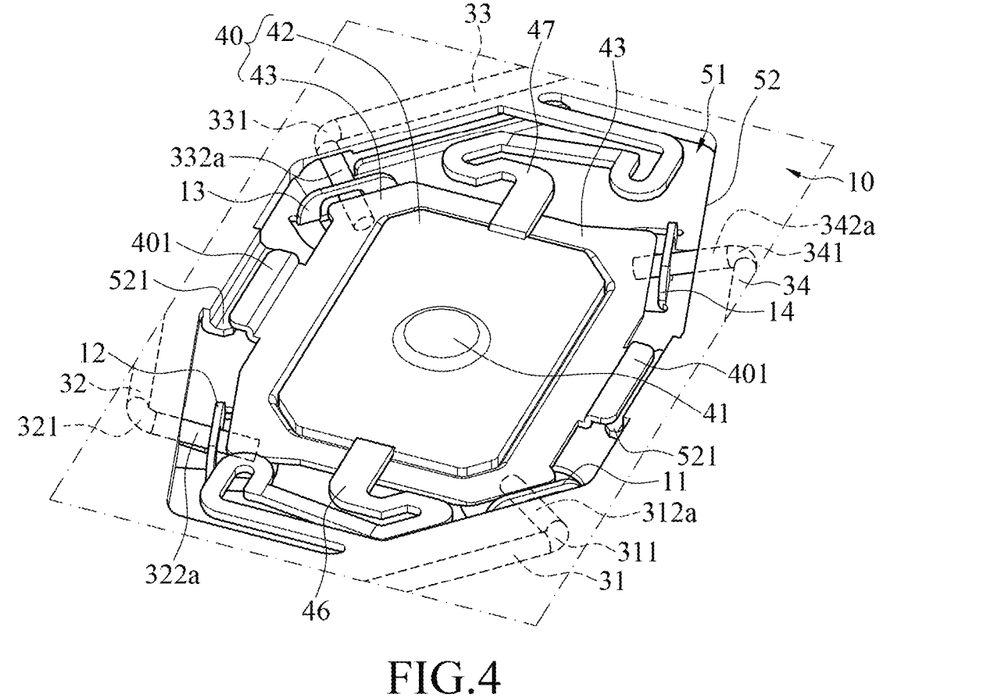
FIG. 4 illustrates an enlarged partial perspective view of FIG. 2.
Figure 5:
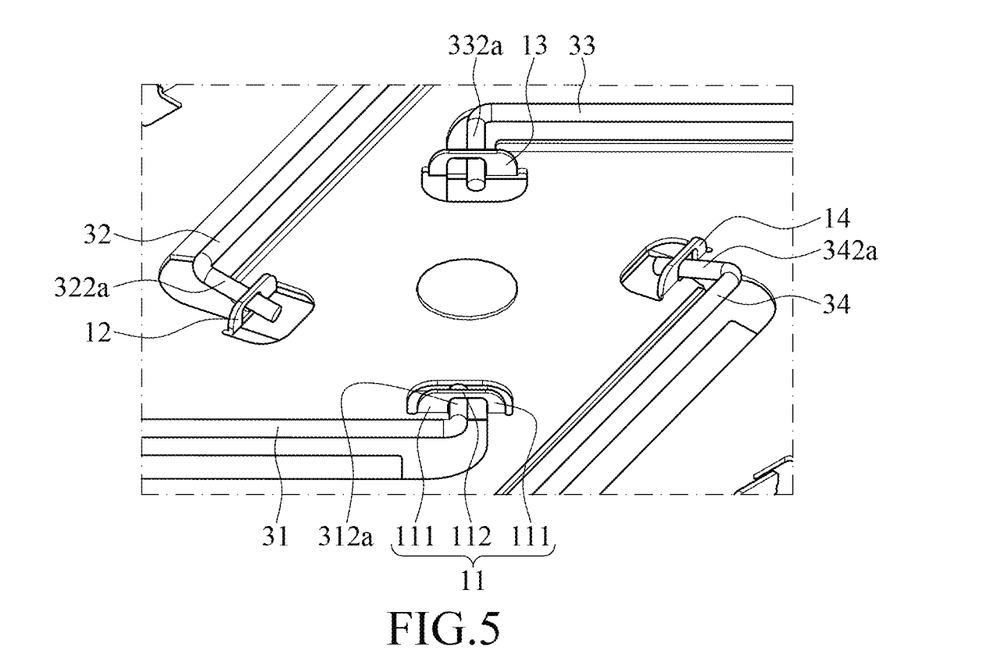
FIG. 5 illustrates an enlarged partial perspective view of FIG. 3.
Figure 6:
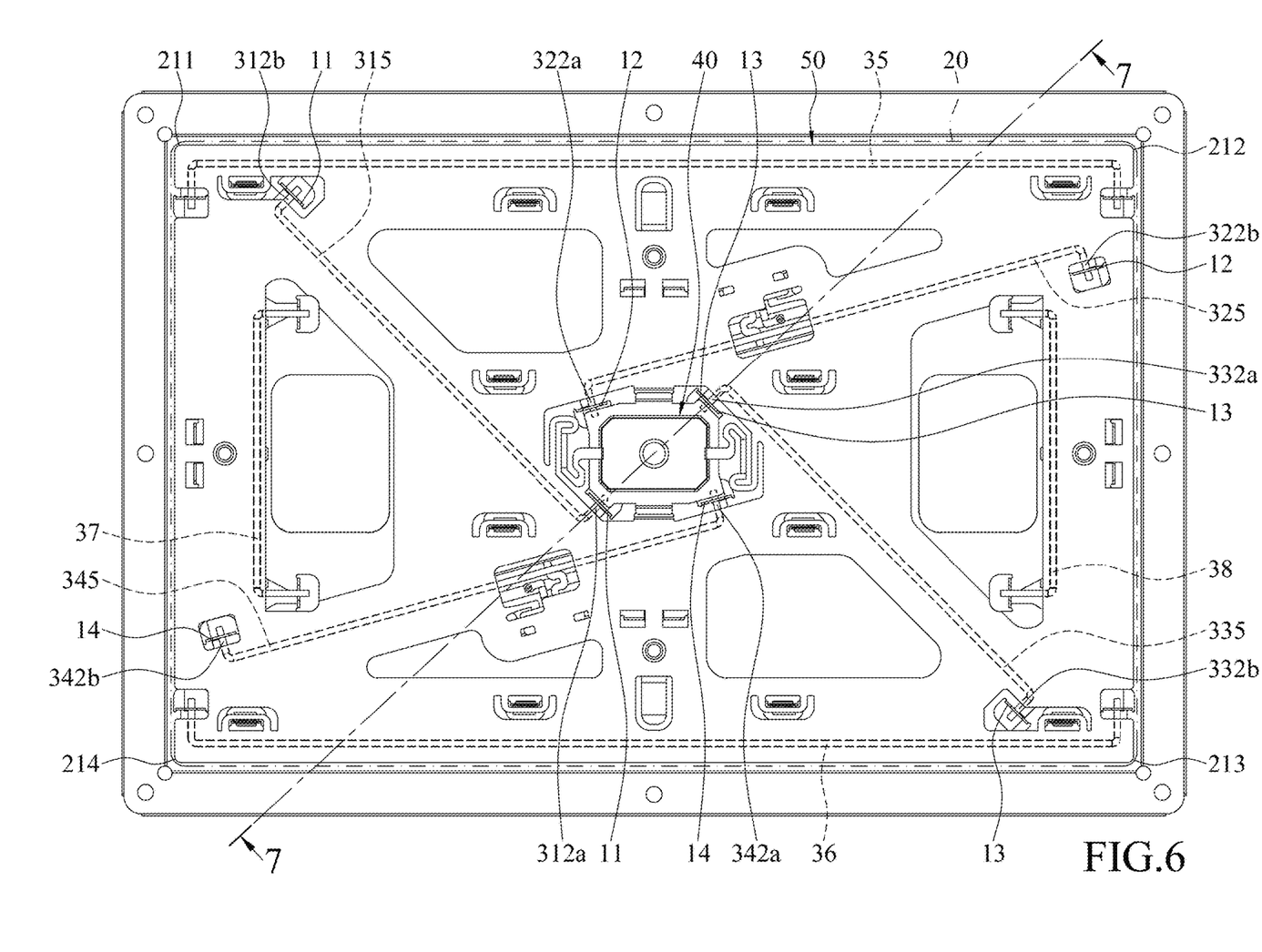
FIG. 6 illustrates a top view of the touchpad device according to the exemplary embodiment of the instant disclosure.

FIG. 4 illustrates an enlarged partial perspective view of FIG. 2, FIG. 5 illustrates an enlarged partial perspective view of FIG. 3, and FIG. 6 illustrates a top view of the touchpad device according to the exemplary embodiment of the instant disclosure. In FIG. 6, the touch panel 20 is illustrated in a see-through manner, so that the configuration of the balancing assembly 30 shielded by the touch panel 20 can be clearly shown. As shown in FIG. 2 to FIG. 6, the first inner end 311 of the first balancing bar 31 adjacent to the switch 22 has a first swing bar 312a, the first outer end 313 of the first balancing bar 31 adjacent to the first corner 211 has a first swing bar 312b, and the two first swing bars 312a, 312b are respectively connected to two opposite ends of the first shaft 315. In this embodiment, each of the two first swing bars 312a, 312b is substantially perpendicular to the first shaft 315. Likewise, the second inner end 321 of the second balancing bar 32 adjacent to the switch 22 has a second swing bar 322a, the second outer end 3232 of the second balancing bar 32 adjacent to the second corner 212 has a second swing bar 322b, and the two second swing bars 322a, 322b are respectively connected to two opposite ends of the second shaft 325. In this embodiment, each of the two second swing bars 322a, 322b is substantially perpendicular to the second shaft 325. Likewise, the third inner end 331 of the third balancing bar 33 adjacent to the switch 22 has a third swing bar 332a, the third outer end 333 of the third balancing bar 33 adjacent to the third corner 213 has a third swing bar 332b, and the two third swing bars 332a, 332b are respectively connected to two opposite ends of the third shaft 335. In this embodiment, each of the two third swing bars 332a, 332b is substantially perpendicular to the third shaft 335. Likewise, the fourth inner end 341 of the fourth balancing bar 34 adjacent to the switch 22 has a fourth swing bar 342a, the fourth outer end of the fourth balancing bar 34 adjacent to the fourth corner 214 has a fourth swing bar 342b, and the two fourth swing bars 342a, 342b are respectively connected to two opposite ends of the fourth shaft 345. In this embodiment, each of the two fourth swing bars 342a, 342b is substantially perpendicular to the fourth shaft 345.

In some embodiments, an angle between each of the first swing bars 312a, 312b and the first shaft 315, an angle between each of the second swing bars 322a, 322b and the second shaft 325, an angle between each of the third swing bars 332a, 332b and the third shaft 335, and an angle between each of the fourth swing bars 342a, 342b and the fourth shaft 345 may not be equal to 90 degrees (for example, may be 30 degrees, 45 degrees, 60 degrees, 120 degrees, 135 degrees, or 150 degrees).

As shown in FIG. 2 to FIG. 6, the substrate 10 is provided with two first assembling members 11, two second assembling members 12, two third assembling members 13, and two fourth assembling members 14. The two first assembling members 11 are spaced apart from each other and are respectively configured to be assembled with the two first swing bars 312a, 312b of the first balancing bar 31. For example, each of the first assembling members 11 may be a plate structure (for example, a U-shaped plate structure, an L-shaped plate structure, or a T-shaped plate structure) integrally extending upwards from the substrate 10, and the two first swing bars 312a, 312b of the first balancing bar 31 are movably assembled with the two first assembling members 11, respectively. Therefore, when the touch panel 20 is pressed and moved downward and toward to the substrate 10, the first shaft 315 of the first balancing bar 31 can rotate with respect to the touch panel 20, and the two first swing bars 312a, 312b can swing with respect to the substrate 10. Hence, end portions of the two first swing bars 312a, 312b are lifted up towards the touch panel 20. The structure of each of the second assembling members 12, the structure of each of the third assembling members 13, and the structure of each of the fourth assembling members 14 may be identical to the structure of each of the first assembling members 11. In this embodiment, the two second assembling members 12 are spaced apart from each other and respectively configured to be movably assembled with the two second swing bars 322a, 322b of the second balancing bar 32, the two third assembling members 13 are spaced apart from each other and respectively configured to be movably assembled with the two third swing bars 332a, 332b of the third balancing bar 33, and the two fourth assembling members 14 are spaced apart from each other and respectively configured to be movably assembled with the two fourth swing bars 342a, 342b. Moreover, upon the touch panel 20 is pressed, the operations of the second balancing bar 32, the third balancing bar 33, and the fourth balancing bar 34 may be identical to the operation of the first balancing bar 31, and repeated descriptions are thus omitted herein.

Furthermore, as shown in FIG. 3 and FIG. 5, in this embodiment, each of the first assembling members 11 comprises two longitudinal plates 111 and a transversal plate 112, the two longitudinal plates 111 are spaced apart from each other and integrally connected to the substrate 10, and each of the two longitudinal plates 111 is perpendicular to the substrate 10. In each of the assembling members 11, the transversal plate 112 is perpendicular to each of the longitudinal plates 111 and is integrally connected between the two longitudinal plates 111. Therefore, each of the first assembling members 11 is formed as a semi-enclosed U-shaped plate structure, each of the first swing bars 312a, 312b of the first balancing bar 31 is between a corresponding one of the two longitudinal plates 111 and the transversal plate 112, and each of the first swing bars 312a, 312b is leaned against a bottom surface of the transversal plate 112. Accordingly, when the touch panel 20 is pressed and moved downward and toward to the substrate 10, each of the first swing bars 312a, 312b can swing with respect to the substrate 10 by taking a portion of the first swing bars 312a, 312b leaning against the transversal plate 112 as a fulcrum, so that the end portion of each of the first swing bars 312a, 312b is lifted up toward the touch panel 20. Moreover, through the configuration that each of the first assembling members 11 is a semi-enclosed U-shaped plate structure, the entire of the first assembling member 11 can have a better structural strength, so that the first assembling member 11 can be prevented from being deformed upon a force is applied to the first assembling member 11. In some embodiments, the structure of each of the second assembling members 12, the structure of each of the third assembling members 13, and the structure of each of the fourth assembling members 14 may be identical to the structure of each of the first assembling members 11 which is the semi-enclosed U-shaped plate structure, and repeated descriptions are thus omitted herein.

Accordingly, in one or some embodiments of the instant disclosure, through the configuration of the balancing assembly 30, when any portion of the touch panel 20 (for example, the corner or the edge of the touch panel 20) is pressed, the pressing force can be directly and quickly transmitted to the switch 22 at the central region 215 through the balancing assembly 30. For example, as shown in FIG. 2, FIG. 3, and FIG. 6, when the first corner 211 of the touch panel 20 is pressed, because the two ends of the first balancing bar 31 are respectively adjacent to the first corner 211 and the switch 22, the pressing force can be directly transmitted to the switch 22 along an extension direction of the first balancing bar 31. Likewise, when the second corner 212 or the third corner 213 or the fourth corner 214 of the touch panel 20 is pressed, the pressing force can be directly transmitted to the switch 22 through the second balancing bar 32 or the third balancing bar 33 or the fourth balancing bar 34. Accordingly, the transmission performance of the pressing force can be enhanced. Moreover, the issues of excessive wobbling, bending, or empty stroke of the touch panel 20 generated upon the corner or the edge of the touch panel 20 is pressed can be prevented.

Figure 7:
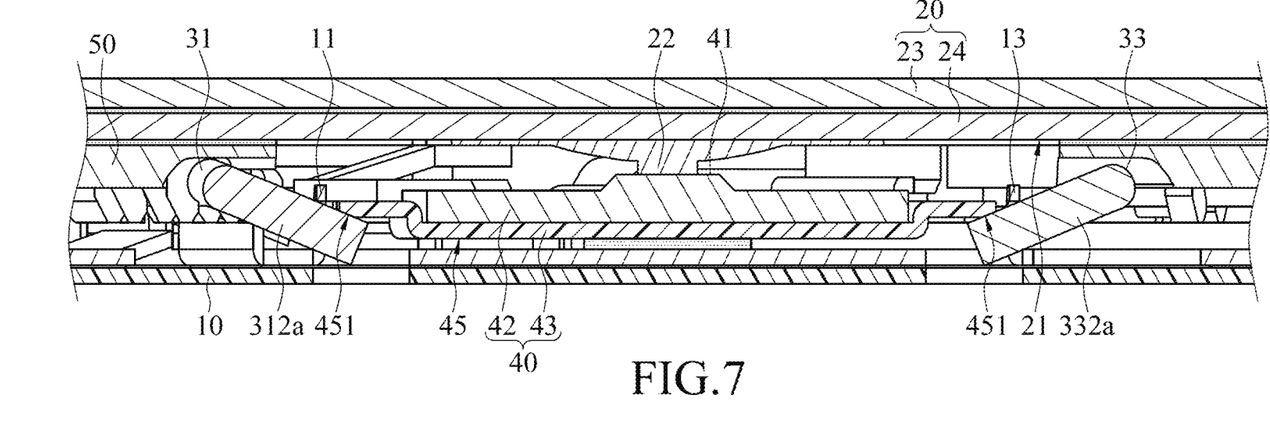
FIG. 7 illustrates a cross-sectional view along the line 7-7 shown in FIG. 6.
Figure 8:
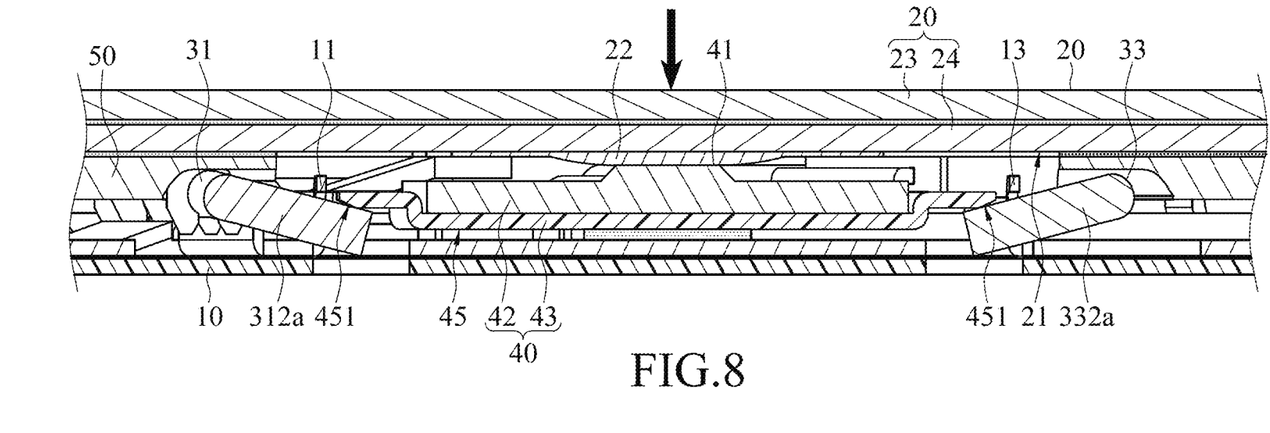
FIG. 8 illustrates a schematic view showing that the touchpad device shown in FIG. 7 is pressed.

FIG. 7 illustrates a cross-sectional view along the line 7-7 shown in FIG. 6, and FIG. 8 illustrates a schematic view showing that the touchpad device shown in FIG. 7 is pressed. As shown in FIG. 2 to FIG. 7, the triggering member 40 is between the central region 215 of the touch panel 20 and the substrate 10, and the triggering member 40 has a top portion 41 and a bottom portion 45. The bottom portion 45 is leaned against end portions of the first swing bar 312a, the second swing bar 322a, the third swing bar 332a, and the fourth swing bar 342a which are adjacent to the switch 22, and the top portion 41 of the triggering member 40 contacts the switch 22 so that the touch panel 20 is maintained at a height position. Moreover, in this embodiment, the assembling plate 50 has a hollow hole 51, and the position of the triggering member 40 corresponds to the position of the hollow hole 51, so that the assembling plate 50 can be prevented from being blocked between the triggering member 40 and the switch 22. Accordingly, as shown in FIG. 7 and FIG. 8, during the process that the touch panel 20 is pressed and moved downward and toward the substrate 10, the end portions of the first swing bar 312a, the second swing bar 322a, the third swing bar 332a, and the fourth swing bar 342a can swing with respect to the substrate 10 so as to apply a force toward the touch panel 20 on the triggering member 40. Therefore, the triggering member 40 is moved upward and toward the switch 22 to press the switch 22, thereby accelerating the triggering of the switch 22 so as to reduce the pressing stroke of the touch panel 20, so that the user can have a better operation feeling.

In some embodiments, the contact between the bottom portion 45 of the triggering member 40 and the end portions of the first swing bar 312a, the second swing bar 322a, the third swing bar 332a, and the fourth swing bar 342a may be in a point-contact manner or a surface-contact manner. For example, as shown in FIG. 7 and FIG. 8, in this embodiment, the bottom portion 45 of the triggering member 40 has a plurality of bevels 451. Under the condition that the touch panel 20 is not pressed (as shown in FIG. 7), the bevels 451 respectively correspond to inclined angles of the first swing bar 312a, the second swing bar 322a, the third swing bar 332a, and the fourth swing bar 342a, and the bevels 451 are respectively leaned against inclined surfaces of the end portions of the first swing bar 312a, the second swing bar 322a, the third swing bar 332a, and the fourth swing bar 342a, so that the contact between the triggering member 40 and the first swing bar 312a, the second swing bar 322a, the third swing bar 332a, and the fourth swing bar 342a is in a surface-contact manner, rather than a point-contact manner. Therefore, when the touch panel 20 is pressed so that the first swing bar 312a, the second swing bar 322a, the third swing bar 332a, and the fourth swing bar 342a swing with respect to the substrate 10, the pressing force can be transmitted to the triggering member 40 more effectively through the surface-contact configuration, thus allowing the triggering member 40 to be lifted up toward the touch panel 20. In some embodiments, the bottom portion 45 of the triggering member 40 may leaned against the end portions of the first swing bar 312a, the second swing bar 322a, the third swing bar 332a, and the fourth swing bar 342a through the side or the corner (e.g., a curved edge or a round corner) of the bottom portion 45 in a point-contact manner.

In some embodiments, the triggering member 40 may be construed by at least one plate structure. For example, as shown in FIG. 2 to FIG. 6, in this embodiment, the triggering member 40 comprises a first plate body 42 and a second plate body 43 stacked and fixed with each other. The first plate body 42 contacts the switch 22, and the second plate body 43 is leaned against the end portions of the first swing bar 312a, the second swing bar 322a, the third swing bar 332a, and the fourth swing bar 342a. For example, the first plate body 42 and the second plate body 43 may be fixed to each other through adhering, engaging, locking, or the like. However, it is noted that the embodiments are provided for illustrative purposes, and the instant disclosure is not limited thereto; in some embodiments, the triggering member 40 may only comprise the first plate body 42 or only comprises the second plate body 43.

In some embodiments, the structural strength of the second plate body 43 may be greater than the structural strength of the first plate body 42. Therefore, when the second plate body 43 is forced by the first swing bar 312a, the second swing bar 322a, the third swing bar 332a, and the fourth swing bar 342a, the second plate body 43 is not broken, deformed, or damaged easily, so that the service life of the second plate body 43 can be prolonged. For example, the material of the second plate body 43 may be different from the material of the first plate body 42; for instance, the second plate body 43 may be made of metal material(s), and the first plate body 42 may be made of plastic material(s). Therefore, the tensile strength, the compressive strength, or the flexural strength of the second plate body 43 is greater than the tensile strength, the compressive strength, or the flexural strength of the first plate body 42. Alternatively, in some embodiments, the second plate body 43 and the first plate body 42 may be made of the same material, and the material density of the second plate body 43 may be greater than the material density of the first plate body 42. Therefore, as compared to the first plate body 42, the second plate body 43 can bear a greater pressure and thus has a better structural strength.

As shown in FIG. 3 and FIG. 4, in this embodiment, the second plate body 43 of the triggering member 40 has a recess 431, and the first plate body 42 is accommodated in the recess 431 of the second plate body 43, so that the first plate body 42 and the second plate body 43 can be limited by each other. Hence, during the operation of the touchpad device 1, the deflection or detachment of the first plate body 42 or the second plate body 43 can be reduced, and the difficulty in assembling the triggering member 40 can be reduced as well.

In some embodiments, the first plate body 42 of the triggering member 40 and the assembling plate 50 may be integrally formed as a one-piece structure. As shown in FIG. 2 to FIG. 6, in this embodiment, the hollow hole 51 of the assembling plate 50 has a hole edge portion 52, a first flexible member 46 is integrally connected between one of two sides of the first plate body 42 of the triggering member 40 and the hole edge portion 52 of the hollow hole 51, and a second flexible member 47 is integrally connected between the other side of the first plate body 42 of the triggering member 40 and the hole edge portion 52 of the hollow hole 51. Each of the first flexible member 46 and the second flexible member 47 may be a flexible arm (as shown in FIG. 3 and FIG. 4) or a flexible sheet and thus has flexibility. Through such configuration, according to one or some embodiments of the instant disclosure, the triggering member 40 can be assembled with the assembling plate 50 to enhance the overall structural strength of the assembly. Moreover, through the flexibility of the first flexible member 46 and the second flexible member 47, when the triggering member 40 is forced by the first swing bar 312a, the second swing bar 322a, the third swing bar 332a, and the fourth swing bar 342a, the triggering member 40 can still move toward the switch 22 to press the switch 22.

As shown in FIG. 2 to FIG. 6, in this embodiment, the triggering member 40 is in the hollow hole 51 of the assembling plate 50. The triggering member 40 has a plurality of first limiting portions 401, the hole edge portion 52 of the hollow hole 51 of the assembling plate 50 has a plurality of second limiting portions 521, and the first limiting portions 401 are respectively leaned against the second limiting portions 521, so that the triggering member 40 can be supported by the second limiting portions 521. Therefore, during the operation of the touchpad device 1, the triggering member 40 can be prevented from being deflected or fell off.

In some embodiments, the first limiting portions 401 of the triggering member 40 and the second limiting portions 521 of the assembling plate 50 may be structures that can lean against each other, and the numbers and positions of the first limiting portions 401 and the numbers and positions of the second limiting portions 521 can be adjusted according to actual product demands. For example, as shown in FIG. 4, in this embodiment, each of the first limiting portions 401 is a folded plate, the number of the first limiting portions 401 is two, and the two first limiting portions 401 respectively extend from two opposite sides of the second plate body 43 of the triggering member 40; likewise, each of the second limiting portions 521 is also a folded plate, the number of the second limiting portions 521 is two, and the two second limiting portions 521 respectively extend from two opposite sides of the hole edge portion 52 of the hollow hole 51, so that the triggering member 40 can be arranged across the two second limiting portions 521 through the two first limiting portions 401.

Figure 9:
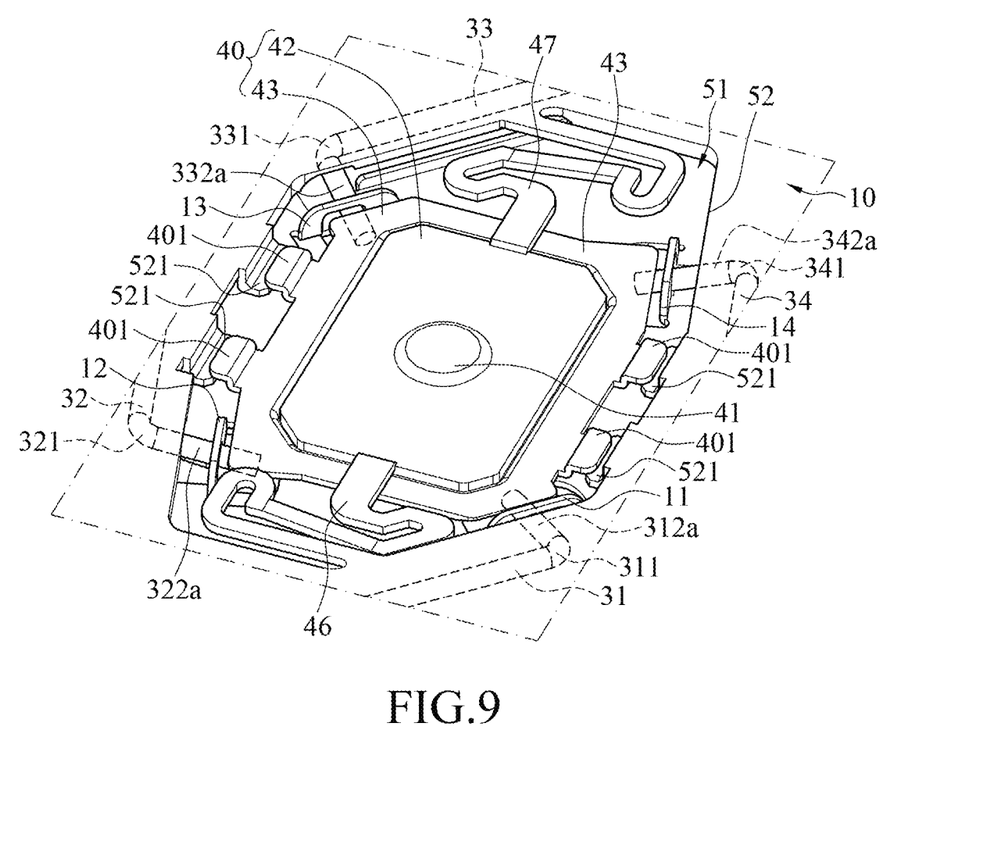
FIG. 9 illustrates an enlarged partial perspective view of a touchpad device according to another exemplary embodiment of the instant disclosure.

However, the foregoing embodiments are provided for illustrative purposes. As shown in FIG. 9, in another embodiment, the number of the first limiting portions 401 may be four, and the four first limiting portions 401 respectively extend from the two opposite sides of the second plate body 43 of the triggering member 40 and are respectively adjacent to four corners of the second plate body 43; likewise, the number of the second limiting portions 521 is also four, and the four second limiting portions 521 are respectively adjacent to four corners of the triggering member 40. Accordingly, under the configuration that the triggering member 40 is arranged across the four second limiting portions 521 through the four first limiting portions 401, a better limiting effect can be provided for the triggering member 40, so that the triggering member 40 can be prevented from being deflected or inclined or fell off.

As shown in FIG. 3 and FIG. 6, in this embodiment, the balancing assembly 30 further comprises a fifth balancing bar 35, a sixth balancing bar 36, a seventh balancing bar 37, and an eighth balancing bar 38. The fifth balancing bar 35 is parallel to the sixth balancing bar 36, two ends of the fifth balancing bar 35 are respectively adjacent to the first corner 211 and the second corner 212 of the touch panel 20, and two ends of the sixth balancing bar 36 are respectively adjacent to the third corner 213 and the fourth corner 214 of the touch panel 20. The seventh balancing bar 37 is parallel to the eighth balancing bar 38, the seventh balancing bar 37 is perpendicular to the fifth balancing bar 35, the two ends of the seventh balancing bar 37 are respectively adjacent to the first corner 211 and the fourth corner 214 of the touch panel 20, and two ends of the eighth balancing bar 38 are respectively adjacent to the second corner 212 and the third corner 213 of the touch panel 20. Therefore, when any corner or edge of the touch panel 20 is pressed, through the linkage among the fifth balancing bar 35, the sixth balancing bar 36, the seventh balancing bar 37, and the eighth balancing bar 38, the movement of the touch panel 20 can be achieved more stably. Therefore, the noises and wobbling during the operation of the touchpad device 1 can be effectively reduced, and the operation feeling of the touchpad device 1 can be enhanced.

Figure 10:
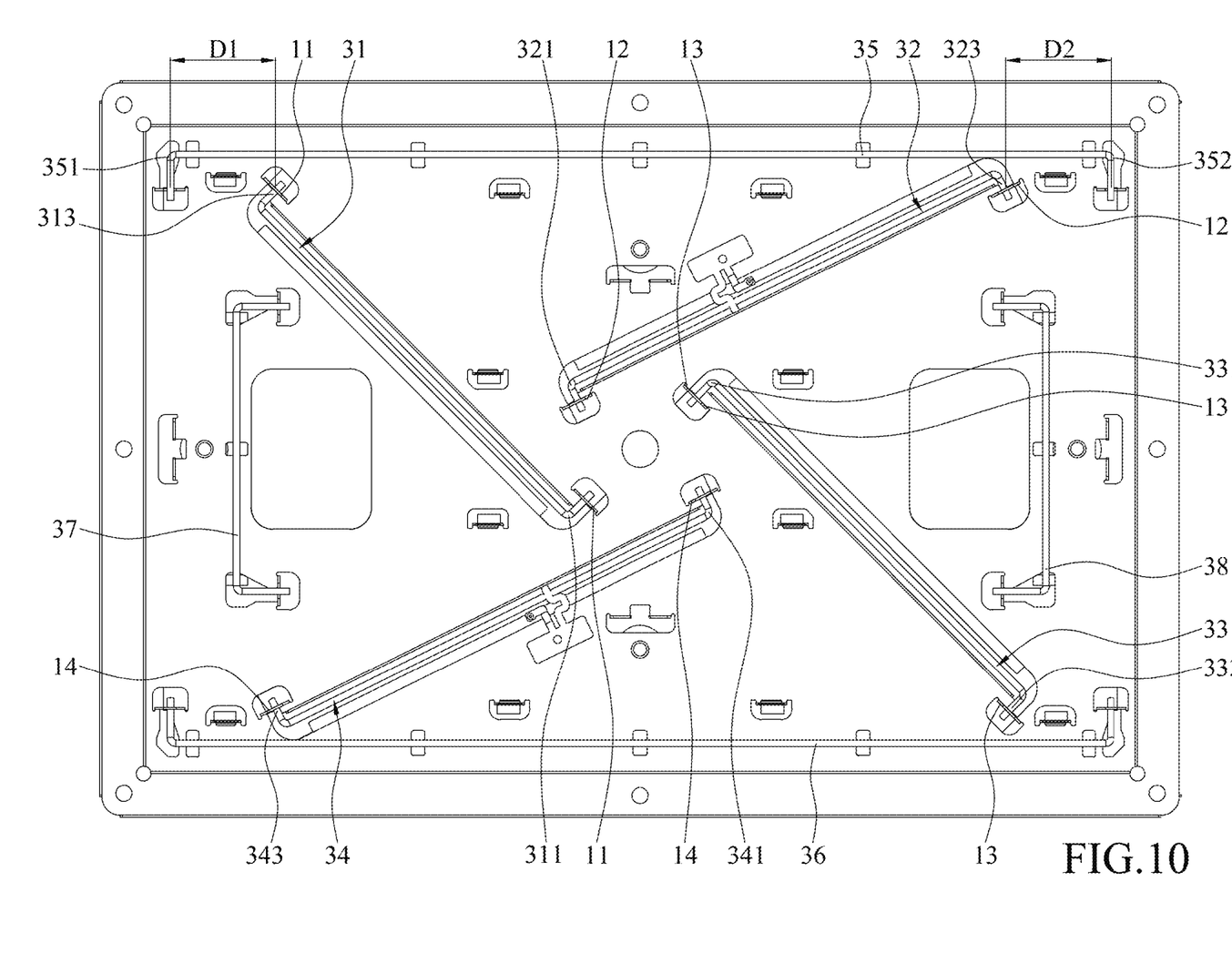
FIG. 10 illustrates a top view of the touchpad device according to the another exemplary embodiment of the instant disclosure.

FIG. 10 illustrates a top view of a touchpad device according to another exemplary embodiment of the instant disclosure. As shown in FIG. 10, the difference between this embodiment and the embodiments shown in FIG. 3 and FIG. 6 is at least that, in this embodiment, a first spacing D1 is between the first outer end 313 of the first balancing bar 31 and a first end 351 of the fifth balancing bar 35 adjacent to the first outer end 313, a second spacing D2 is between the second outer end 323 of the second balancing bar 32 and a second end 352 of the fifth balancing bar 35 adjacent to the second outer end 352, and the first spacing D1 is equal to the second spacing D2. The first spacing D1 may be referred to the spacing between the first outer end 313 and the first end 351 along a horizontal direction (as shown in FIG. 10) or a linear distance between the first outer end 313 and the first end 351. Likewise, the second spacing D2 may be referred to the spacing between the second outer end 323 and the second end 352 along the horizontal direction (as shown in FIG. 10) or a linear distance between the second outer end 323 and the second end 352. Therefore, according to one or some embodiments of the instant disclosure, through the configuration that the first spacing D1 is equal to the second spacing D2, whether the user presses the first corner 211 or the second corner 212 of the touch panel 20, the pressing force can have the same transmission efficiency, so that the user can have the same pressing feeling. Similarly, as shown in FIG. 10, the spacing between the third outer end 333 of the third balancing bar 33 and one of two ends of the sixth balancing bar 36 adjacent to the third outer end 333 may be equal to the first spacing D1, and a spacing between the fourth outer end 343 of the fourth balancing bar 34 and the other end of the sixth balancing bar 36 adjacent to the fourth outer end 343 may be equal to the first spacing D1 as well. Therefore, under such configuration, whether the user presses the first corner 211, the second corner 212, the third corner 213, or the fourth corner 214 of the touch panel 20, the user can have the same pressing feeling.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A touchpad device comprising:
   a substrate;
   a touch panel disposed above the substrate, wherein the touch panel has an inner surface facing the substrate, and the inner surface has a central region;
   a switch disposed between the substrate and the touch panel, wherein the switch corresponds to the central region;
   a balancing assembly disposed between the touch panel and the substrate, wherein the balancing assembly comprises a first balancing bar, a second balancing bar, a third balancing bar, and a fourth balancing bar arranged radially, wherein a first inner end of the first balancing bar is adjacent to the switch and has a first swing bar, a second inner end of the second balancing bar is adjacent to the switch and has a second swing bar, a third inner end of the third balancing bar is adjacent to the switch and has a third swing bar, and a fourth inner end of the fourth balancing bar is adjacent to the switch and has a fourth swing bar; and
   a triggering member disposed between the central region of the touch panel and the substrate, wherein the triggering member has top portion and a bottom portion, the bottom portion is leaned against end portions of the first swing bar, the second swing bar, the third swing bar, and the fourth swing bar, and the top portion contacts the switch.

2. The touchpad device according to claim 1, wherein the inner surface has a first corner, a second corner, a third corner, and a fourth corner, the first corner and the third corner are opposite corners, and the second corner and the fourth corner are opposite corners; a first outer end of the first balancing bar opposite to the first inner end is adjacent to the first corner, a second outer end of the second balancing bar opposite to the second inner end is adjacent to the second corner, a third outer end of the third balancing bar opposite to the third inner end is adjacent to the third corner, and a fourth outer end of the fourth balancing bar opposite to the fourth inner end is adjacent to the fourth corner.

3. The touchpad device according to claim 2, wherein the balancing assembly further comprises a fifth balancing bar and a sixth balancing bar, two ends of the fifth balancing bar are respectively adjacent to the first corner and the second corner, and two ends of the sixth balancing bar are respectively adjacent to the third corner and the fourth corner.

4. The touchpad device according to claim 3, wherein the balancing assembly further comprises a seventh balancing bar and an eighth balancing bar, two ends of the seventh balancing bar are respectively adjacent to the first corner and the fourth corner, and two ends of the eighth balancing bar are respectively adjacent to the second corner and the third corner.

5. The touchpad device according to claim 3, wherein a first spacing is between the first outer end of the first balancing bar and one of two ends of the fifth balancing bar, a second spacing is between the second outer end of the second balancing bar and the other end of the fifth balancing bar, and the first spacing is equal to the second spacing.

6. The touchpad device according to claim 1, wherein the bottom portion of the triggering member has a plurality of bevels, the bevels are respectively leaned against surfaces of the end portions of the first swing bar, the second swing bar, the third swing bar, and the fourth swing bar.

7. The touchpad device according to claim 1, wherein the inner surface of the touch panel is provided with an assembling plate, the first balancing bar has a first shaft, the second balancing bar has a second shaft, the third balancing bar has a third shaft, the fourth balancing bar has a fourth shaft; the first shaft, the second shaft, the third shaft, and the fourth shaft are pivotally connected to the assembling plate, the assembling plate has a hollow hole, and a position of the triggering member corresponds to a position of the hollow hole.

8. The touchpad device according to claim 7, wherein the triggering member is in the hollow hole, the triggering member has a plurality of first limiting portions, the hollow hole has a hole edge portion, the hole edge portion has a plurality of second limiting portions, and the first limiting portions are respectively leaned against the second limiting portions.

9. The touchpad device according to claim 8, wherein the second limiting portions are respectively adjacent to different corners of the triggering member.

10. The touchpad device according to claim 7, wherein the hollow hole has a hole edge portion, a first flexible member is connected between one of two sides of the triggering member and the hole edge portion, and a second flexible member is connected between the other side of the triggering member and the hole edge portion.

11. The touchpad device according to claim 10, wherein the triggering member comprises a first plate body and a second plate body stacked and fixed with each other, and the first flexible member and the second flexible member are integrally connected between the hole edge portion and the first plate body.

12. The touchpad device according to claim 1, wherein the triggering member comprises a first plate body and a second plate body stacked and fixed with each other, the first plate body contacts the switch, and the second plate body is leaned against the end portions of the first swing bar, the second swing bar, the third swing bar, and the fourth swing bar.

13. The touchpad device according to claim 12, wherein a structural strength of the second plate body is greater than a structural strength of the first plate body.

14. The touchpad device according to claim 12, wherein the second plate body has a recess, and the first plate body is accommodated in the recess.

15. The touchpad device according to claim 1, wherein the substrate is provided with a first assembling member, the first swing bar is movably assembled on the first assembling member, the first assembling member comprises two longitudinal plates and a transversal plate, the two longitudinal plates are spaced apart from each other and integrally connected to the substrate, the transversal plate is integrally connected between the two longitudinal plates, the first swing bar is between the two longitudinal plates and the transversal plate, and the first swing bar is leaned against the transversal plate.

* * * * *